United States Patent
Borchardt et al.

(10) Patent No.: US 10,839,655 B1
(45) Date of Patent: Nov. 17, 2020

(54) THREAT MONITORING AND NOTIFICATIONS

(71) Applicant: Wells Fargo Bank, N.A., San Francisco, CA (US)

(72) Inventors: Jennifer Stacey Borchardt, San Francisco, CA (US); Adam Clifford Christensen, Moraga, CA (US); Charles Cowell, Dublin, CA (US); Eduardo DeLa Torre, Oakland, CA (US); Darren M. Goetz, Salinas, CA (US); Eric David Greene, Piedmont, CA (US); Robert Glenn Hamchuk, San Jose, CA (US); Miranda C. Hill, Seattle, WA (US); Pey-Ning Huang, San Francisco, CA (US); Orsolya Oldroyd, Walnut Creek, CA (US); Paul Vittimberga, Oakland, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 236 days.

(21) Appl. No.: 15/485,548

(22) Filed: Apr. 12, 2017

(51) Int. Cl.
| G06F 17/00 | (2019.01) |
| G07G 3/00 | (2006.01) |
| G07F 19/00 | (2006.01) |
| G07G 1/00 | (2006.01) |

(52) U.S. Cl.
CPC ......... *G07G 3/006* (2013.01); *G07F 19/2055* (2013.01); *G07G 1/0009* (2013.01)

(58) Field of Classification Search
CPC .... G07G 3/006; G07G 3/003; G07F 19/2055; G07F 19/207; G07F 19/209; G06Q 30/0248; G01F 15/007

USPC .......................................................... 705/35
See application file for complete search history.

(56) References Cited

U.S. PATENT DOCUMENTS

| 8,478,692 | B2 | 7/2013 | Carlson et al. |
| 8,604,929 | B1 | 12/2013 | Yadav-Ranjan |
| 8,624,727 | B2 | 1/2014 | Saigh et al. |
| 8,793,188 | B2 * | 7/2014 | Larkin ............ G06Q 20/20 705/44 |
| 8,813,050 | B2 | 8/2014 | Watters et al. |
| 9,219,990 | B2 | 12/2015 | Moldavsky et al. |
| 9,311,632 | B1 | 4/2016 | Dent |
| 9,313,326 | B2 | 4/2016 | Dessouky et al. |
| 9,319,471 | B2 | 4/2016 | Diem |

(Continued)

FOREIGN PATENT DOCUMENTS

| GB | 2363943 A | 1/2002 | |
| GB | 2422705 A * | 8/2006 | ............ G07F 19/20 |

OTHER PUBLICATIONS

Tully, Jim et al., "Internet of Things Primer for 2016," Mar. 31, 2016, 8 pages.

(Continued)

*Primary Examiner* — Scott S Trotter
(74) *Attorney, Agent, or Firm* — Merchant & Gould P.C.

(57) ABSTRACT

A system for monitoring financial threats includes: at least one central processing unit and system memory that causes the system to: receive information about a threat associated with a financial services device; identify a type of the threat; identify a location associated with the threat; and notify one or more customers associated with the financial services device based upon the type or the location of the threat.

9 Claims, 6 Drawing Sheets

(56) References Cited

U.S. PATENT DOCUMENTS

| | | | |
|---|---|---|---|
| 9,367,845 | B2 | 6/2016 | Candelore et al. |
| 9,380,441 | B1 | 6/2016 | White et al. |
| 9,418,358 | B2 | 8/2016 | Johnson et al. |
| 9,449,327 | B2 | 9/2016 | Carlson et al. |
| 9,652,772 | B1 * | 5/2017 | Eyges ................ G06Q 20/4016 |
| 9,842,338 | B1 * | 12/2017 | Shukla ............... G06Q 30/0185 |
| 2004/0034604 | A1 * | 2/2004 | Klebanoff .............. G06Q 20/04 705/65 |
| 2007/0203826 | A1 | 8/2007 | Russell et al. |
| 2009/0204524 | A1 * | 8/2009 | McGeorge ............ G06Q 20/32 705/35 |
| 2014/0067649 | A1 | 3/2014 | Kannan et al. |
| 2014/0164224 | A1 | 6/2014 | Grigg et al. |
| 2014/0279331 | A1 * | 9/2014 | Gimby ................... G06Q 40/02 705/35 |
| 2015/0073981 | A1 | 3/2015 | Adjaoute |
| 2015/0235268 | A1 | 8/2015 | Bell et al. |
| 2015/0348042 | A1 | 12/2015 | Jivraj et al. |
| 2016/0134644 | A1 * | 5/2016 | Chan ....................... H04L 67/18 726/7 |
| 2016/0140555 | A1 | 5/2016 | Scipioni |
| 2016/0157064 | A1 | 6/2016 | Gardman et al. |
| 2018/0165681 | A1 * | 6/2018 | Megyeri .............. G06Q 20/405 |

OTHER PUBLICATIONS

Velosa, Alfonso, et al., "Hype Cycle for the Internet of Things, 2016," Jul. 14, 2016, 68 pages.

Velosa, Alfonso et al., "Maturity Model for the Internet of Things," Mar. 2, 2016, 18 pages.

Tully, Jim, "IoT: Key Lessons to Date and Action Plan for 2016," Feb. 12, 2016, 8 pages.

Prentice, Stephen, "The Six Forces That Will Shape Business and Technology in 2030," Feb. 1, 2016, 9 pages.

Friedman, Ted et al., "Predicts 2016: Unexpected Implications Arising From the Internet of Things," Dec. 3, 2015, 13 pages.

Cearley, David W. et al., "Top 10 Strategic Technology Trends for 2016," Feb. 29, 2016, 15 pages.

Burke, Brian et al., "Top 10 Strategic Technology Trends for 2016: Internet of Things Architecture and Platforms," Feb. 19, 2016, 11 pages.

Cearley, David W. et al, "Top 10 Strategic Technology Trends for 2016: Ambient User Experience," Feb. 26, 2016, 11 pages.

Walker, Mike J. et al., "Top 10 Strategic Technology Trends for 2016: Information of Everything," Feb. 26, 2016, 11 pages.

Plummer, Daryl C. et al., "Top Strategic Predictions for 2016 and Beyond: The Future Is a Digital Thing," Oct. 2, 2015, 27 pages.

Jones, Nick, "Top 10 IoT Technologies for 2017 and 2018," Jan. 22, 2016, 12 pages.

Geschickter, Chet et al., "Measuring the Strategic Value of the Internet of Things for Industries," Apr. 28, 2016, 14 pages.

Furlonger, David et al., "Toolkit: IoT Strategic Technology Map for Financial Services Initiatives," Dec. 2, 2015, 4 pages.

Furlonger, David et al., "Survey Analysis: Financial Services CIOs Should Not Ignore the Internet of Things," Mar. 17, 2015, 17 pages.

Moyer, Kristin R. et al., "Measuring the Strategic Value of Financial Services IoT," Dec. 2, 2015, 10 pages.

Newton, Alistair et al., "Gartner's Digital Banking Customer Advisory Framework," Jul. 7, 2016, 8 pages.

Moyer, Kristin R., "Industry Vision: Banks as Platforms," Apr. 22, 2016, 11 pages.

Moyer, Kristin R. et al., "Industry Vision: Tipping Point for Banks as Platforms," May 3, 2016, 11 pages.

Moyer, Kristin R., "The Economics of Connections for Banking," Mar. 8, 2016, 12 pages.

Geschickter, Chet et al., "Survey Analysis: Early Adopters of Internet of Things Poised to Make 2016 the Year of the Customer," Feb. 12, 2016, 15 pages.

Lehong, Hung et al., "Building a Digital Business Technology Platform," Jun. 8, 2016, 21 pages.

Wisniewski, Mary, "Testing Location-Based Services for Itinerant Bank Customers," http://www.americanbanker.com/issues/179_164/testing-location-based-services-for-itinerantbank-customers-1069597-1.html, Aug. 25, 2014, 2 pages.

M2 Presswire, "Diners Club cuts fraud with ai Corporation; Diners Club South Africa has recently implemented new fraud detection and prevention software from ai Corporation," http://dialog.proquest.com/, Apr. 5, 2016, 5 pages.

Sujith, B, "Crime Detection and Avoidance in ATM: A New Framework," http://www.techrepublic.com/resource-library/whitepapers/crime-detection-and-avoidance-in-atm-a-new-framework/, International Journal of Computer Science and Information Technologies, vol. 5 (5) , 2014, 4 pages.

* cited by examiner

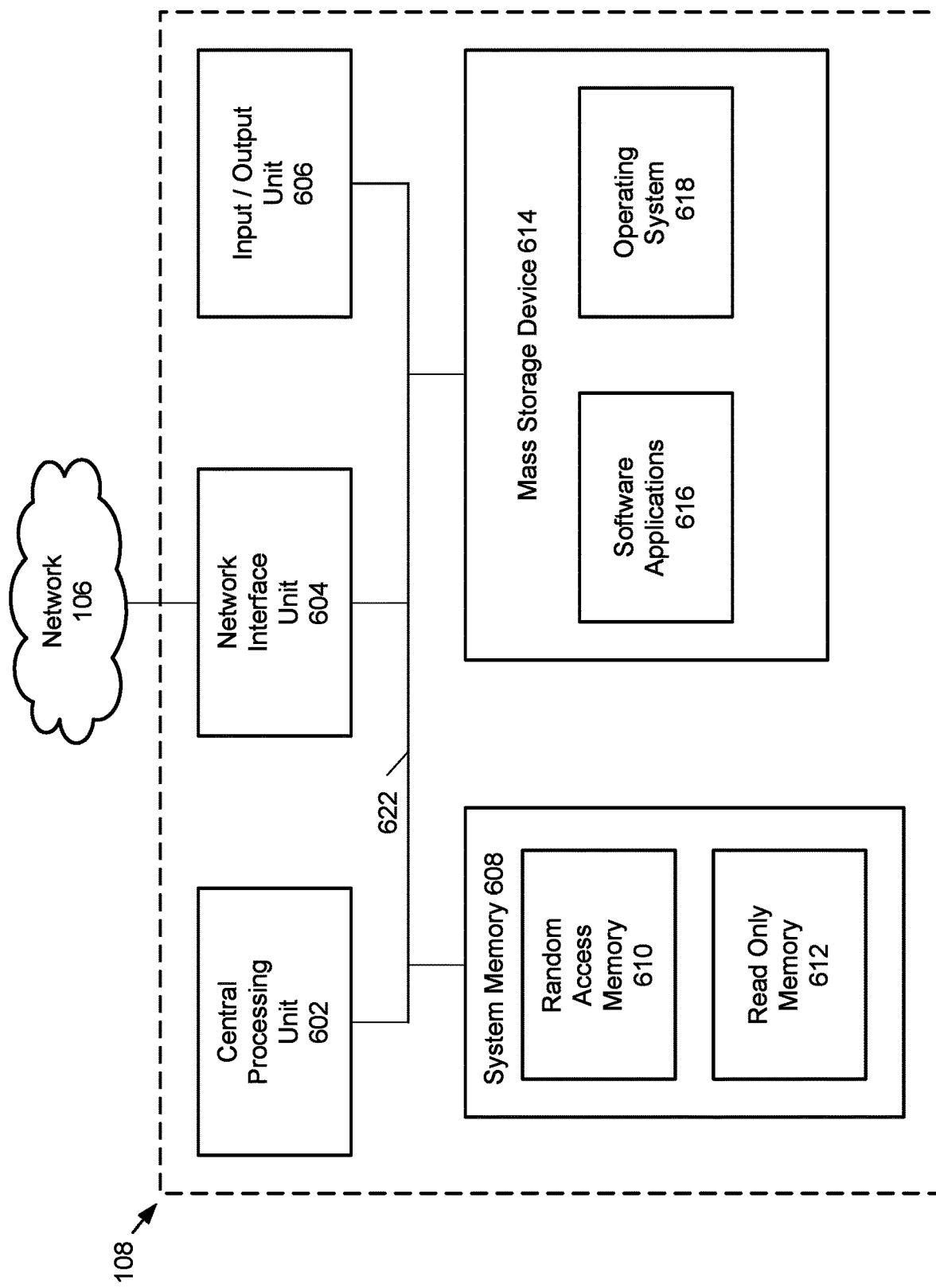

THREAT MONITORING AND NOTIFICATIONS

BACKGROUND

Financial threats are prevalent in both today's online and real-world environments. These threats take various forms. For example, a "skimmer" is a device used by thieves at automated teller machines (ATMs) and other card locations to steal account information. These skimmer devices mimic typical slots that accept ATM cards and credit cards. When a customer places his or her card into the skimmer device, the device reads the account information on the card and stores that information for later use by the thieves who placed the skimmer device. The customer usually does not even know that his or her card information has been compromised. Other threats, such as robbery, fire/natural disaster/structural emergency, suspicious activity, proximal criminal activity or other events that threaten public safety, are also possible.

SUMMARY

Embodiments of the disclosure are directed to systems and methods for identifying and notifying customers of financial threats.

In one aspect, a system for monitoring financial threats includes: at least one central processing unit; and system memory encoding instructions that, when executed by the at least one central processing unit, cause the system to: receive information about a threat associated with a financial services device; identify a type of the threat; identify a location associated with the threat; and notify one or more customers associated with the financial services device based upon the type or the location of the threat.

In another aspect, a method for managing a threat associated with an automated teller machine includes: receiving information about a threat associated with an automated teller machine; identifying a type of the threat; identifying a location associated with the threat; and notifying one or more customers associated with the automated teller machine based upon the type or the location of the threat.

In yet another aspect, a method for managing a threat associated with an automated teller machine includes: receiving information about a threat associated with an automated teller machine; identifying a type of the threat; identifying a location associated with the threat; notifying one or more customers associated with the automated teller machine based upon the type and the location of the threat; and identifying an alternative automated teller machine based upon the location of the threat.

The details of one or more techniques are set forth in the accompanying drawings and the description below. Other features, objects, and advantages of these techniques will be apparent from the description, drawings, and claims.

DESCRIPTION OF THE DRAWINGS

FIG. 6 shows example physical components of the financial institution server computer of FIG. 1.

DETAILED DESCRIPTION

The present disclosure is directed to systems and methods for identifying and notifying customers of financial threats.

In the examples provided herein, a threat is identified. This threat can take various forms, such as the compromise of a financial services device like an ATM or credit card reader at a point of sale (POS) devices at a merchant location, such as a store or restaurant.

Once this threat is identified, customers who have been impacted by the threat or may be impacted by the threat can be notified. In some examples, remedial action, such as the freezing of impacted accounts, can also be taken in an automated fashion.

Although the examples described herein relate to financial services devices like ATMs and POS devices, other financial service devices are equally applicable. For example, other devices that accept cards, account information, and/or personal information (e.g., passwords, pins, etc.) can also be used with the systems and methods described herein.

Further, other types of threats beyond those associated with skimmer devices can be identified and notifications sent therefore. For example, a restaurant associated with fraudulent credit card activities could be identified and notifications can be sent to patrons who are within or close to the restaurant. In another example, threats associated with swindling or other fraudulent activities associated with particular areas and/or service providers can be identified and notifications sent thereabout.

Figure 1:
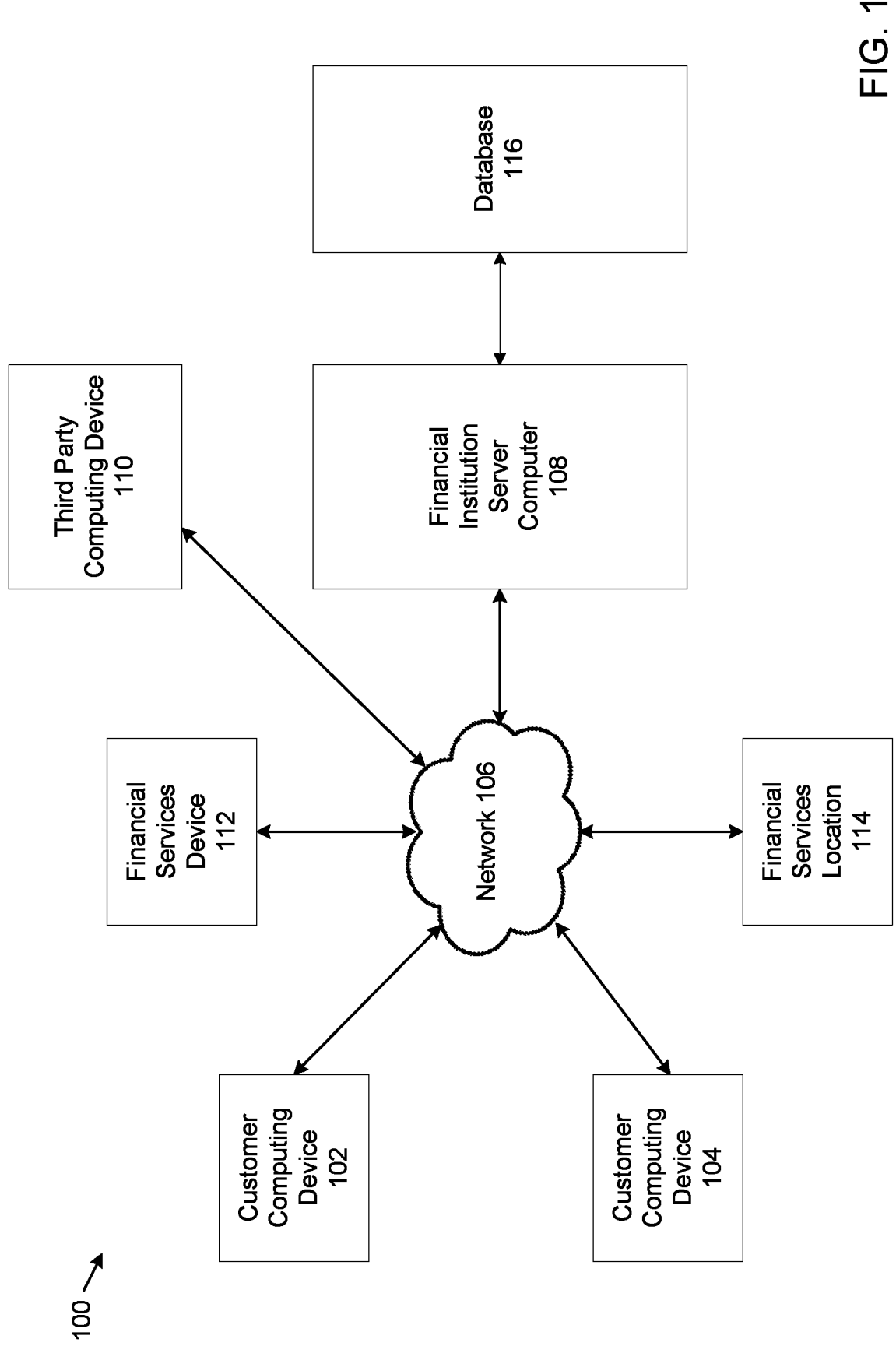
FIG. 1 shows an example system that monitors and notifies of financial threats.

FIG. 1 shows an example system 100 that monitors and notifies of financial threats. The system 100 includes customer computing devices 102, 104, a network 106, a financial institution server computer 108, a third party computing device 110, a financial services device 112, a financial services location 114, and a database 116. This is one example configuration, and many other possible configurations for the system 100 are possible.

The example customer computing devices 102, 104 can be used by customers to log into financial institution server computer 108 via the network 106. When logged in, the customer can access the customer's financial accounts at the financial institution, provide information, and perform transaction and other financial-related activities. In these examples, the customer computing devices 102, 104 can be various types of computing devices, like laptops, tablets, smartphones, wearables like watches, etc.

The example network 106 is a computer network, such as the Internet. The various computing devices in the system 100 are coupled to the network 106 through wired or wireless mechanisms to communicate therethrough.

The example financial institution server computer 108 is a server computer of a financial institution, such as a bank. Financial institution server computer 108 contains or has access to financial records of the customer, including customer personal information and information regarding customer accounts.

The third party computing device 110 is a computing device of an entity unassociated with the financial institution server computer 108. For example, the third party computing device 110 can be a news agency reporting about financial threats (e.g., in new releases), a law enforcement computing device that reports about financial threats, a separate financial institution, or even another customer reporting about a perceived financial threat (e.g., if a customer finds a skimmer device on an ATM and reports that to authorities and/or a financial institution). The third party computing device 110 can be used to communicate financial threat information to the financial institution server computer 108, as described further below.

The financial services device 112 is a device such as an ATM or POS device. The financial services device 112 can be configured, in some instances as described, to report threats automatically. Or, other entities, such as the entities associated with the third party computing device 110, can be used to report the threats.

The example database 116 is a database associated with the financial organization. Financial and other information regarding the customer can be stored in database 116. The financial institution server computer 108 can query the database 116 to access and store information related to customers and accounts. Other information, such as locations of ATMs and other financial devices, can also be stored and accessed within the database 116.

Figure 2:
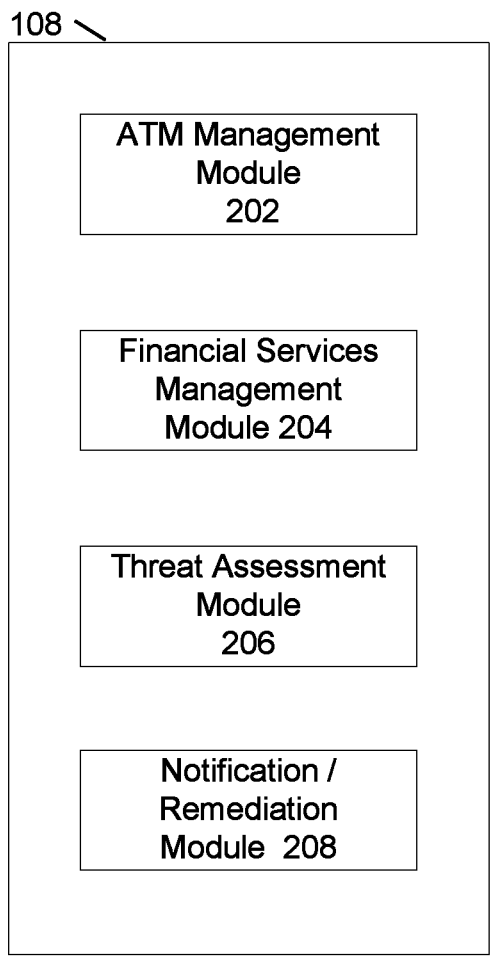
FIG. 2 show example modules of the financial institution server computer of FIG. 1.

Referring now to FIG. 2, example components of the financial institution server computer 108 are shown. In this example, the financial institution server computer 108 includes an ATM management module 202, a financial services management module 204, a threat assessment module 206, and a notification/remediation module 208. These are examples only, and the financial institution server computer 108 can be programmed in many different manners.

The ATM management module 202 is programmed to manage the various ATMs that are owned by the financial institution. In this example, the ATM management module 202 manages at least the location and status of each of the ATMs. As threats are identified and reported to the system 100, the ATM management module 202 receives those threats and identifies any impacted ATMs. The status of the impacted ATMs is updated in the database 116. The ATM management module 202 then indicates the status of those ATMs, as described further below.

The financial services management module 204 performs functionality similar to the ATM management module 202, except the financial services management module 204 manages other financial devices. For example, the financial services management module 204 can track the status of various POS devices at merchant locations, such as credit card machines at cash registers in stores. The financial services management module 204 can receive threat information and update the status of those devices within the database 116.

The threat assessment module 206 is programmed to receive a threat and identify the impact of the threat on the devices managed by the system 100. This identification can be an automated process, such as the threat assessment module 206 receiving threat information electronically and automatically assessing the threat information using preprogrammed and/or artificial intelligence. Or, the assessment can be a manual process where one or more individuals receive the threat information and assess it. Then, the individual(s) input that information using the threat assessment module 206.

This threat can take various forms. For example, law enforcement can provide threat information, such as the identification of a skimmer device on an ATM or POS device. In other examples, a different financial institution can report a threat at an ATM. In yet other examples, customers can be used to report threats at various locations, such as a compromised ATM. Other sources of the threat information can also be used, such as news reports, etc.

Once this threat information is received by the threat assessment module 206, the threat assessment module 206 identifies the impact of the threat. For example, if a report is provided by law enforcement that a skimmer device has been found at an ATM located at a location X, the threat assessment module 206 identifies the type of threat, the location of the threat, and any impact the threat may have on devices and/or customers.

For example, for a compromised ATM, the threat assessment module 206 can identify the impacted ATM and update that status of the ATM within the database 116. In this example, the statuses can include: offline (non-operational); normal; and compromised. The threat assessment module 206 updates the status of the ATM at location X to "compromised".

Further, the threat assessment module 206 can assess the nature of the threat. If the threat involves a skimmer device, the threat assessment module 206 can also identify one or more of: (i) customers who may have already been impacted by the skimmer device; and/or (ii) customers who may be impacted by the skimmer device in the future.

For example, a customer can report the existence of a skimmer device on an ATM using the customer's computing device 102. Once reported, the threat assessment module 206 can update the status of the ATM (e.g., to "compromised"). The threat assessment module 206 can also identify customers who may have used the ATM recently, as well as customers who typically use or are in the vicinity of the ATM.

The notification/remediation module 208 uses the assessment by the threat assessment module 206 to provide any necessary notification and/or remediation based upon the identified threat.

For example, with the compromised ATM at location X, the notification/remediation module 208 is programmed to notify any customers who have used the ATM within a predefined period of time to let the customers know that their card information may have been compromised. Notification can take various forms, such as a toast provided by the financial services program running on the customer computing devices 102, 104, a text message, an email, and/or a call. One example of such a notification is: "You recently used the ATM located at X. This ATM was recently identified as having been compromised. Please call xxx-xxx-xxxx to secure your account information. Thank you."

Further, the notification/remediation module 208 can also automatically freeze or even close an account to protect those impacted customers. If the account is frozen, the customer can be notified and given instructions on how to safeguard and re-open the account.

In addition, when a threat is identified but cannot be addressed immediately, customers who may be impacted in the future can be notified. For example, with the ATM being compromised at location X, the ATM may not be controlled by the financial institution (e.g., the ATM may be owned by another financial institution). In this instance, the compromised ATM may not be safeguarded by the financial institution, so it is possible that future customers could be impacted before the threat is addressed. In that instance, the notification/remediation module 208 is programmed to identify those customer who might be impacted in the future and notify those customers of the threat. For example, if a customer normally withdraws money from the ATM at the location X, the customer can be notified proactively of the threat. Further, if a customer happens to be located near the location X, the customer can be notified of the threat in case the customer would try to use the ATM. An example of such a notification is: "We want to inform you that the ATM located at X has recently been reported as being compromised. We recommend using an alternative ATM until the issue can be addressed. Please call xxx-xxx-xxxx if you have any questions about your account. Thank you."

In some embodiments, the notification/remediation module 208 can also provide the customer with alternative financial resources. For example, with the ATM compromised at location X, the notification/remediation module 208 can access the database 116 to provide the customer with options for other ATMs located close to the location X that have not been compromised. In that example, the notification from the notification/remediation module 208 can both identify the threat for the customer, as well as identify possible alternatives. An example of such a notification is: "We want to inform you that the ATM located at X has recently been reported as being compromised. We recommend using an alternative ATM, such as the one located at location Y, until the issue can be addressed. Please call xxx-xxx-xxxx if you have any questions about your account. Thank you."

In another instance, when the customer uses the customer computing devices 102, 104, a financial services application on the customer computing devices 102, 104 can be used to notify the customer of the threat. A map or other listing of alternative ATM locations can also be provided on the customer computing devices 102, 104. Again, such notifications can be provided within the application or through various other mechanisms, such as text message, email, phone call, etc.

In yet another example, the notification/remediation module 208 can also be programmed to automatically and/or through a manual request switch the customer's account to one or more backup cards. For example, a backup card can be provisioned, either automatically or manually by the customer. If the present customer's card is compromised, the notification/remediation module 208 can be programmed to close the compromised card account and automatically switch to the backup card and notify the customer of the same. This can result in near-seamless service for the customer. This process could be beneficial, for example, for a customer who is traveling and unable to easily reach the financial services institution to deal with such an issue. Similar configurations are possible.

Figure 3:
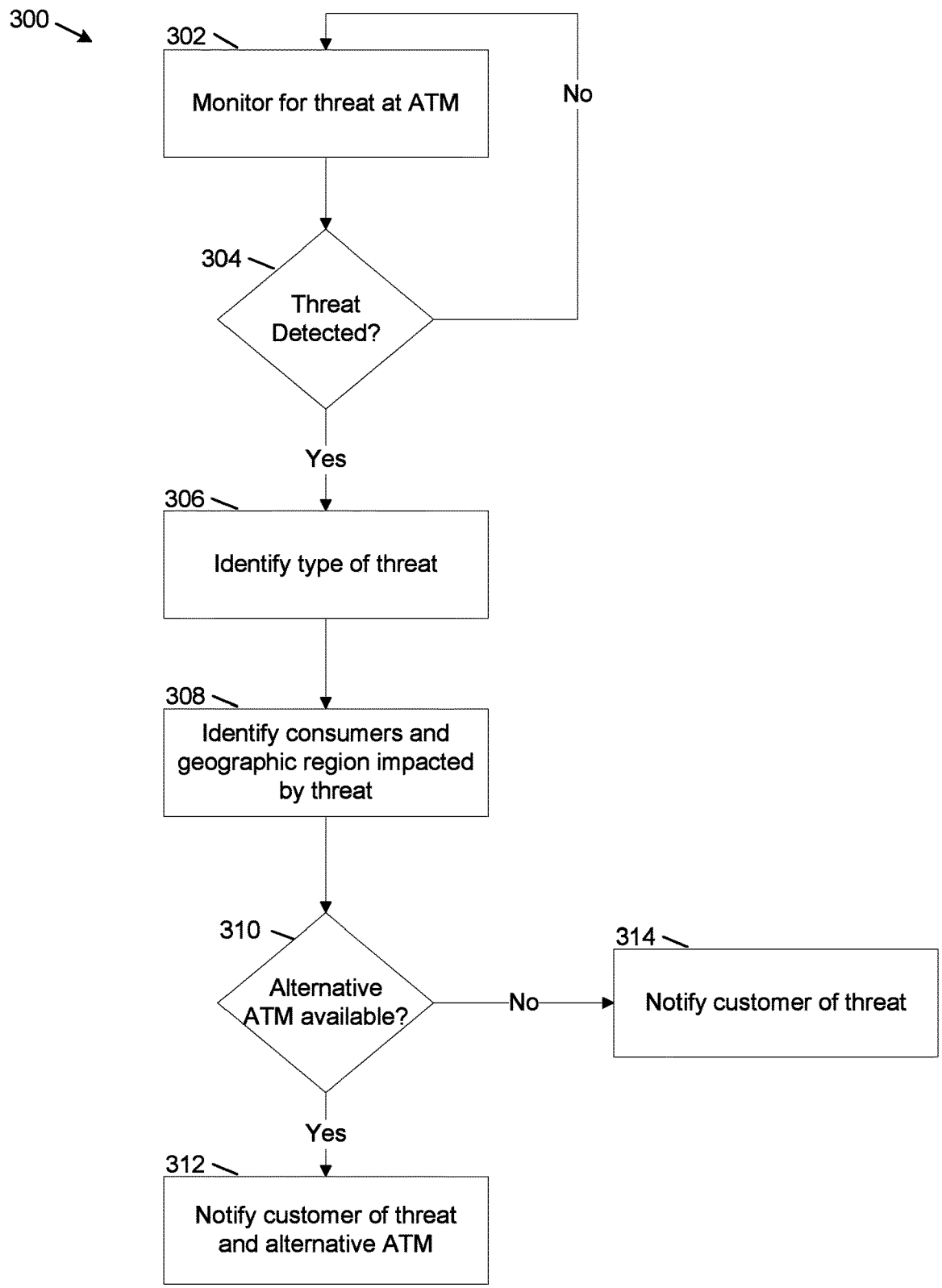
FIG. 3 shows an example method for identifying and notifying of financial threats at an automated teller machine.

Referring now to FIG. 3, an example method 300 for identifying and notifying of financial threats at an ATM is shown. In this example method, the threat is identified and assessed, and notification and/or remedial actions are taken.

At operation 302 of the method 300, monitoring is performed for a threat. This monitoring can be automated, in that the ATM can be configured to report when the ATM has been compromised. The monitoring can also include a more manual process, where threats are reported by third parties, such as law enforcement, other financial institutions, and/or customers.

Control is passed to operation 304, and a determination is made regarding whether or not a threat has been detected. If not, control is passed back to operation 302.

Otherwise, if a threat has been detected at an ATM, control is instead passed to operation 306. At operation 306, the type of threat is identified. For example, if the threat is reported as a compromise of the ATM (e.g., if a skimmer device is detected and/or reported), the ATM is identified as a compromised ATM.

Next, at operation 308, the impacted customers and location of the impacted ATM is also identified. This can be important, as noted below, for notifying impacted customers and/or for identifying alternative ATM locations.

Next, at operation 310, a determination is made, based upon the location of the compromised ATM, whether or not there are alternative ATMs available for the customer. If so, control is passed to operation 312, at which the impacted customers are notified and potential alternative ATM locations are provided. If alternative ATM locations are not available (e.g., the next ATM is too far away and/or all ATMs within a given location have been compromised or are otherwise offline, then control is instead passed to operation 314, and the customer is simply notified of the threat.

Figure 4:
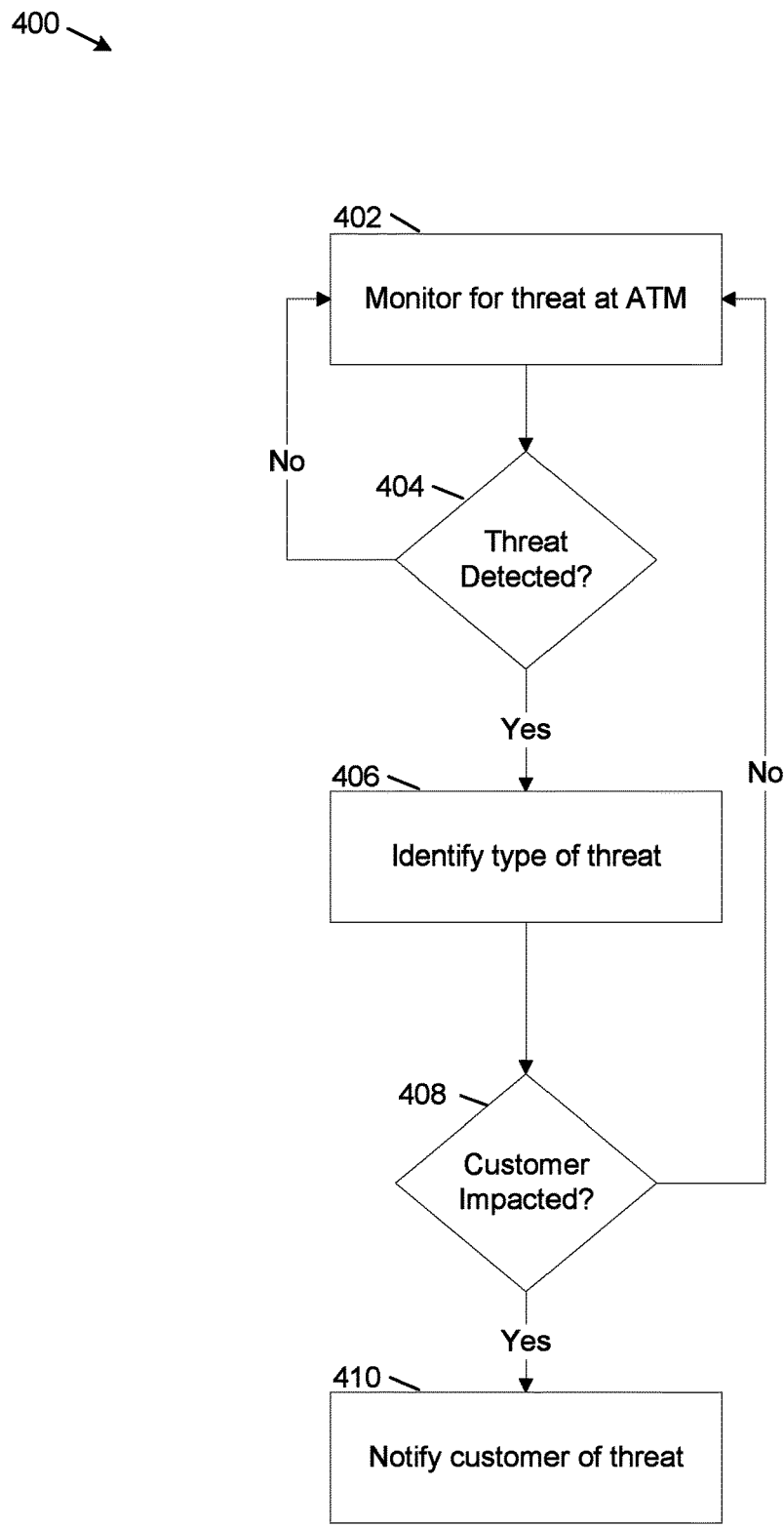
FIG. 4 shows another example method for identifying and notifying of financial threats at an automated teller machine.

Referring now to FIG. 4, another example method 400 is shown for identifying and notifying of financial threats at an automated teller machine.

The method 400 is similar to the method 300 described above, except the method 400 addresses the scenario in which the financial institution does not own or otherwise control the impacted ATM. As noted, in these instances, it may be also desirable to notify customers who might be impacted in the future, since the compromised ATM may not be addressed immediately.

At operation 402, threats at ATMs are monitored. As noted, these threats can be monitored automatically and/or through a manual reporting process.

Next, at 404, a determination is made regarding whether or not a threat has been detected. If not, control is passed back to operation 402.

Otherwise, if a threat has been detected at an ATM, control is instead passed to operation 406. At operation 406, the type of threat is identified, as described above.

At operation 408, a determination is made regarding whether or not a customer could be impacted by the threat. For example, if the financial institution knows that the customer has typically used the ATM in the past and/or that the customer is close to the ATM (e.g., the financial services program on the customer's computing devices 102, 104 can report the customer's location automatically to the system 100), control can be passed to operation 410. Otherwise, control is passed back to operation 402.

Next, at operation 410, the customer is notified of the potential threat proactively so that the customer can avoid the impacted ATM. Alternative ATM locations can also be provided.

Figure 5:
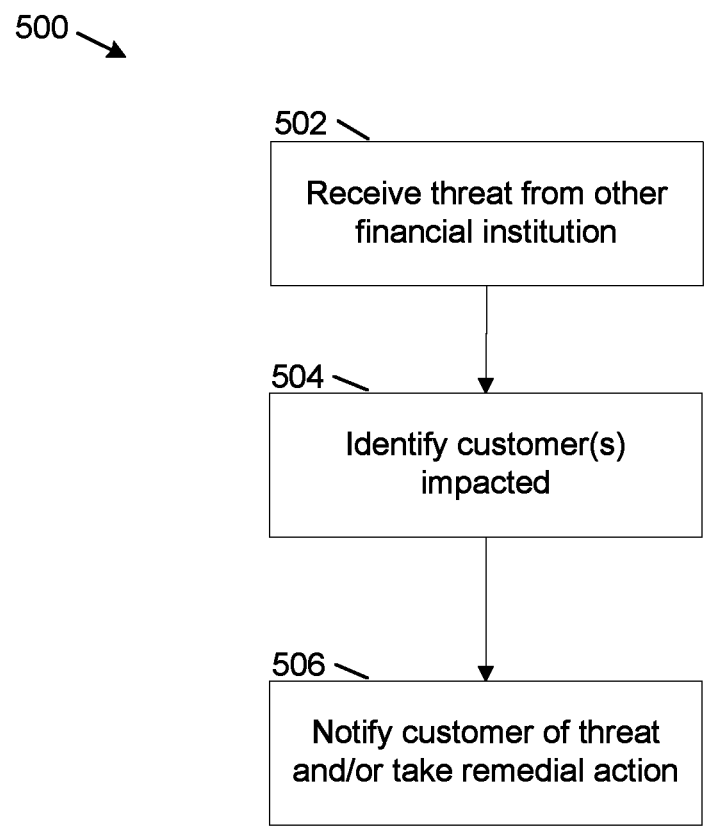
FIG. 5 shows another example method for identifying and notifying of financial threats.

Referring now to FIG. 5, another example method 500 is shown for identifying and notifying of financial threats. The method 500 is similar to the methods 300, 400 described above, with the following noted distinctions.

Specifically, the method 500 addresses threats involving any financial services device. This can include an ATM or other devices, such as POS devices. Further, the method 500 addressed the scenario in which the financial institution does not control or otherwise own the compromised financial services device. For example, the threat information can be received from another financial institution, such as the third party computing device 110 in FIG. 1, reporting that one of the other financial institution's ATMs has been compromised. In such a scenario, the notification can be provided proactively.

At operation 502 of the method 500, the threat is received from the other financial institution. The threat information can include the identity of the financial services device, the location of the financial services device, and/or the type of compromise (e.g., a skimmer device).

Next, at operation 504, the impacted customers are identified. This identification, as noted, can be both retrospective and prospective notification.

For example, at operation 506, customers who actually used the financial services device can be notified and appropriate remedial action taken, as noted above. Further, customers who are likely (e.g., based upon prior actions like habits and/or location) to use the impacted financial services device can be notified proactively so that the customers avoid the impacted financial services device.

The systems and methods described herein allow for the more robust and efficient addressing of threat information. For example, the systems are able to function more securely through the processes described herein by limiting a number of customers impacted by these threats. Further, the threat information can be more efficiently conveyed throughout the system, resulting in further efficiencies.

Although the examples provided herein relate to threat notifications, other types of notifications can also be processed and sent using the systems and methods described. For example, identification of other issues, such as outages and shortages, can also be processed, and notifications can be sent to relevant customers. For example, if information is received about an ATM that is out of cash, the system can notify customers about that shortage and suggest alternative ATMs. Other configurations are possible.

Further, different types of threats can be notified. Other types of similar threats include, without limitation, robbery, fire/natural disaster/structural emergency, suspicious activity, proximal criminal activity or other events that threaten public safety.

As illustrated in the example of FIG. 6, the financial institution server computer 108 includes at least one central processing unit ("CPU") 602, also referred to as a processor, a system memory 608, and a system bus 622 that couples the system memory 608 to the CPU 602. The system memory 608 includes a random access memory ("RAM") 610 and a read-only memory ("ROM") 612. A basic input/output system that contains the basic routines that help to transfer information between elements within the financial institution server computer 108, such as during startup, is stored in the ROM 612. The financial institution server computer 108 further includes a mass storage device 614. The mass storage device 614 is able to store software instructions and data. Some or all of the components of the financial institution server computer 108 can also be included in the other computing devices described herein.

The mass storage device 614 is connected to the CPU 602 through a mass storage controller (not shown) connected to the system bus 622. The mass storage device 614 and its associated computer-readable data storage media provide non-volatile, non-transitory storage for the financial institution server computer 108. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the financial institution server computer 108.

According to various embodiments of the invention, the financial institution server computer 108 may operate in a networked environment using logical connections to remote network devices through the network 106, such as a wireless network, the Internet, or another type of network. The financial institution server computer 108 may connect to the network 106 through a network interface unit 604 connected to the system bus 622. It should be appreciated that the network interface unit 604 may also be utilized to connect to other types of networks and remote computing systems. The financial institution server computer 108 also includes an input/output controller 606 for receiving and processing input from a number of other devices, including a touch user interface display screen, or another type of input device. Similarly, the input/output controller 606 may provide output to a touch user interface display screen or other type of output device.

As mentioned briefly above, the mass storage device 614 and the RAM 610 of the financial institution server computer 108 can store software instructions and data. The software instructions include an operating system 618 suitable for controlling the operation of the financial institution server computer 108. The mass storage device 614 and/or the RAM 610 also store software instructions and software applications 616, that when executed by the CPU 602, cause the financial institution server computer 108 to provide the functionality of the financial institution server computer 108 discussed in this document. For example, the mass storage device 614 and/or the RAM 610 can store software instructions that, when executed by the CPU 602, cause the financial institution server computer 108 to display received data on the display screen of the financial institution server computer 108.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A system for monitoring financial threats, the system comprising:
   at least one central processing unit; and
   a system memory, the system memory encoding instructions that, when executed by the at least one central processing unit, cause the system to:
   receive information that specifically identifies a threat associated with a financial services device, wherein the financial services device is an automated teller machine;
   identify a type of the threat, the type of the threat including a skimmer device at the automated teller machine;
   identify a location associated with the threat;
   notify one or more customers associated with the financial services device based upon the type or the location of the threat and a current customer location, including:

receive the current customer location of a specific customer from a computing device associated with the specific customer; and through a financial services application associated with the specific customer, notify the specific customer of the threat when the current customer location is near the location associated with the threat;

notify the specific customer of the threat when the customer exhibited a pattern of using the automated teller machine before the threat;

upon determining that the specific customer's account has been compromised, automatically freeze or close the account or switch the account to another account; and provide a map listing an alternative financial services device on the financial services application based upon the current customer location.

2. The system of claim 1, wherein the system memory encodes further instructions that, when executed by the at least one central processing unit, cause the system to: identify the one or more customers who might be impacted by the threat at the financial services device.

3. The system of claim 1, wherein the system memory encodes further instructions that, when executed by the at least one central processing unit, cause the system to:
identify the alternative financial services device; and
notify the one or more customers of the alternative financial services device.

4. The system of claim 3, wherein the system memory encodes further instructions that, when executed by the at least one central processing unit, cause the system to: find the alternative financial services device based upon the location.

5. A method for managing a threat associated with an automated teller machine, the method comprising:
receiving information that specifically identifies a threat associated with an automated teller machine;
identifying a type of the threat, the type of the threat including a skimmer device at the automated teller machine;
identifying a location associated with the threat; and
notifying one or more customers associated with the automated teller machine based upon the type or the location of the threat and a current customer location, including:
receiving the current customer location of a specific customer from a computing device associated with the specific customer; and
through a financial services application associated with the specific customer, notifying the specific customer of the threat when the current customer location is near the location associated with the threat;
notifying the specific customer of the threat when the customer exhibited a pattern of using the automated teller machine before the threat;
upon determining that the specific customer's account has been compromised, automatically freezing or closing the account or switch the account to another account; and
providing a map listing an alternative automated teller machine on the financial services application based upon the current customer location.

6. The method of claim 5, further comprising identifying the one or more customers who might be impacted by the threat at the automated teller machine.

7. The method of claim 6, further comprising identifying the one or more customers who might be impacted by the threat at the automated teller machine based upon prior actions of the one or more customers.

8. The method of claim 5, further comprising:
identifying the alternative automated teller machine; and
notifying the one or more customers of the alternative automated teller machine.

9. The method of claim 8, further comprising finding the alternative automated teller machine based upon the location.

* * * * *